United States Patent

Ruffer

Patent Number: 5,815,939
Date of Patent: Oct. 6, 1998

[54] MARKING ATTACHMENT FOR TAPE MEASURE "MEASURE MARKER"

[76] Inventor: Robert T. Ruffer, 646 Rice St., Bellwood, Ill. 60104-1861

[21] Appl. No.: 758,898

[22] Filed: Dec. 2, 1996

[51] Int. Cl.[6] .................................................. G01B 3/10
[52] U.S. Cl. .................................. 33/760; 33/770; 33/668
[58] Field of Search .............................. 33/760, 761, 768, 33/770, 668

[56] References Cited

U.S. PATENT DOCUMENTS

| | | |
|---|---|---|
| 2,807,886 | 10/1957 | Aciego . |
| 3,063,157 | 11/1962 | Keene . |
| 3,148,455 | 9/1964 | Aciego . |
| 3,262,211 | 7/1966 | Beckett . |
| 3,336,678 | 8/1967 | Chamberlain et al. . |
| 3,802,083 | 4/1974 | Freed . |
| 3,885,314 | 5/1975 | Banas, Sr. .................................. 33/668 |
| 4,015,337 | 4/1977 | Taylor . |
| 4,296,554 | 10/1981 | Hammerstrom . |
| 4,439,927 | 4/1984 | Elliott ....................................... 33/668 |
| 4,542,589 | 9/1985 | Yamamoto . |
| 4,580,347 | 4/1986 | McKnight . |
| 4,630,376 | 12/1986 | Pentecost .................................. 33/760 |
| 4,651,429 | 3/1987 | Ljungberg et al. . |
| 4,667,412 | 5/1987 | Carlson . |
| 4,729,171 | 3/1988 | Samson ..................................... 33/760 |
| 4,760,648 | 8/1988 | Doak et al. ............................... 33/760 |
| 4,766,673 | 8/1988 | Bolson . |
| 4,914,830 | 4/1990 | Legaré . |
| 4,964,225 | 10/1990 | Waldherr . |
| 4,965,941 | 10/1990 | Agostinacci .............................. 33/760 |
| 5,154,006 | 10/1992 | Wooster . |
| 5,172,486 | 12/1992 | Waldherr . |
| 5,295,308 | 3/1994 | Stevens et al. . |
| 5,416,978 | 5/1995 | Kaufman ................................... 33/761 |
| 5,435,074 | 7/1995 | Holevas et al. ........................... 33/668 |
| 5,477,619 | 12/1995 | Kearns . |

*Primary Examiner*—Christopher W. Fulton
*Attorney, Agent, or Firm*—Marshall, O'Toole, Gerstein, Murray & Borun

[57] ABSTRACT

A totally enclosed marking attachment for any tape measure which is engaged by lifting finger pull (10) to a preset stop (15) then releasing said lift. This causes a striker (3) which contains a nylon fiber saturated with a consumer determined color and type ink to thrust downward through a striker slide (10) and contact ink head (9) with the desired destination. Said striker (3) is then returned to its original (neutral) position by means of main spring (5). Upon the return of striker (3) slide cap (7), which was opened by said striker (3) on its downward motion, is retuned to its original position to close striker slide (2) by cap spring (8). The entire procedure can be performed with one hand.

18 Claims, 5 Drawing Sheets

MARKING ATTACHMENT FOR TAPE MEASURE "MEASURE MARKER"

BACKGROUND—FIELD OF INVENTION

This invention relates to marking devices for measuring tapes.

BACKGROUND—DESCRIPTION OF PRIOR ART

When the average person takes a measurement with a conventional tape measure, they usually proceed by establishing the starting point with one hand then extending the coilled tape to the desired destination with the remaining hand. At this point both hands are occupied. The user must then release one hand, fumble for a marking devise, then switch hands so they may enter the mark with the hand they normally write with. Prior patents have addressed the problem of marking a measured article by pressing down on a quill or sliding a pencil onto a desired destination. For example, U.S. Pat. Nos. 5,477,619 (Jul. 15, 1994), 4,760,648 (Oct. 20, 1986), 4,296,554 (Aug. 18, 1980) and 4,965,941 (Nov. 29, 1989). This is awkward, causing inconsistent markings and thus inaccurate measurements. These forms of marking devices prove to be more of a hindrance to the measuring procedure than the device is worth. This causes the device to be abandoned by the consumer or unmarketable.

One of the natures of measuring tapes is that they are often dropped and bumped. Many previous arts such as U.S. Pat. No. 4,965,941 (Nov. 29, 1989) and U.S. Pat. No. 4,630,376 (Apr. 26, 1985) are very delicate in design and exist exposed on a tape measure making them more vulnerable to damage from bumping or dropping and therefore prove to be impractical.

Pencil type markers constantly need to be removed and sharpened due to breakage and wear which make them inconvenient. If the unit is inconvenient it is not worth having.

Most marking devices for tape measures require the manufacture of a complete "tape measure assembly" along with their marking devise as in U.S. Pat. Nos. 4,965,941 (Nov. 29, 1989), 4,667,412 (Sep. 2, 1986), 4,766,673 (Jul. 8, 1987), 4,580,347 (Aug. 23, 1984), 4,630,376 (Apr. 26, 1985), and 4,015,337 (Jun. 7, 1976). This is costly and time consuming and puts the consumer in the position of spending money for a product (tape measure) they already own.

Using lead or pencils for marking, forces the user to make repeated marking strokes to produce a visible mark. Some patents simply mark in the form of a dot. Others make a mark parallel to the tape measure. This does not mirror a conventional mark made by hand and is therefore undesirable. It tends to make the mark easy to loose when trying relocate at a later time.

As in U.S. Pat. No. 3,802,083 (Mar. 17, 1972) the attachment is located on the inside of the tape which causes the loss of the use of the belt hook. This marker uses a downward motion which is awkward and the unit is exposed to damage from bumping or dropping. In addition most measurements are preferred to be taken and marked without the extra step of locking (arresting) and unlocking the tape. U.S. Pat. Nos. 5,477,619 (Jul. 15, 1994), 4,760,648 (Oct. 20, 1986) and 4,296,554 (Aug. 18, 1980), as well as being push downward type markers, are exposed. They refer to a pencil, point, or, "dot" type quill which needs maintenance and leave marks that can be difficult to locate. In addition, as in other patents, the marker can injure the user with the exposed point or points. (claim)

Objects and Advantages

My marker was designed to make the measuring and marking procedure quicker and easier. It eliminates the need for fumbling for a pencil and placing the hands in awkward positions. It makes a perfect, clean perpendicular mark thousands of times without refilling, replacing, or sharpening. The mark is made by a lifting motion rather than a pushing down motion much like the plucking of a guitar string with your index finger. This is much easier, more practical, and makes much more consistent and accurate marks. (claim)

Other advantages are:

1) My invention can be incorporated in a measuring tape, but can also be made as an attachment and mounted to a consumer owned tape measure without screws by means of a foam mounting tape. (claim)
2) The actual marking process is quick and simple and mirrors plucking the string on a guitar with your index finger.
3) It, unlike pencil types, makes a clear distinct highly visible mark and the marks are identical each and every time.
4) Ink color and type can be consumer changed.
5) Said marker, unlike other arts, marks with a simple lift of a finger, rather then pushing down on a quill or pencil or sliding the entire tape measure side to side. This gives a much more accurate mark and measurement and allows one to measure and mark an object with one hand.
6) It makes a mark perpendicular to the tape measure on the "far" side of the measuring tape which matches a conventional mark made by hand with a pencil.
7) It makes a mark ¼ inch long much like a hand made mark and not a dot which can be lost when trying to relocate said mark.
8) Makes the same size mark every single time.
9) Makes searching for a marking device obsolete.
10) Speeds up the measuring and marking procedure
11) Eases the monotony of the measuring procedure.
12) Marks with one hand, right side up or up side down.
13) My marking device is completely enclosed in a housing making it durable and less susceptible to harm or harming the user. (claim)
14) The housing makes the unit resistant to shock.
15) My patent makes the mark quickly with no locking or unlocking step needed yet does not interfere with the locking advantage or procedure.
16) The housing is split and can be opened for striker replacement
17) It makes marking glass, which is very difficult or impossible to mark with pencil type markers, just as easy as paper or wood. It also marks acrylics, mirrors, drywall, wood, paper and many other surfaces single handed and with ease making it very marketable to different trades something other patents cannot do.

DRAWING FIGURES

Figure 4:
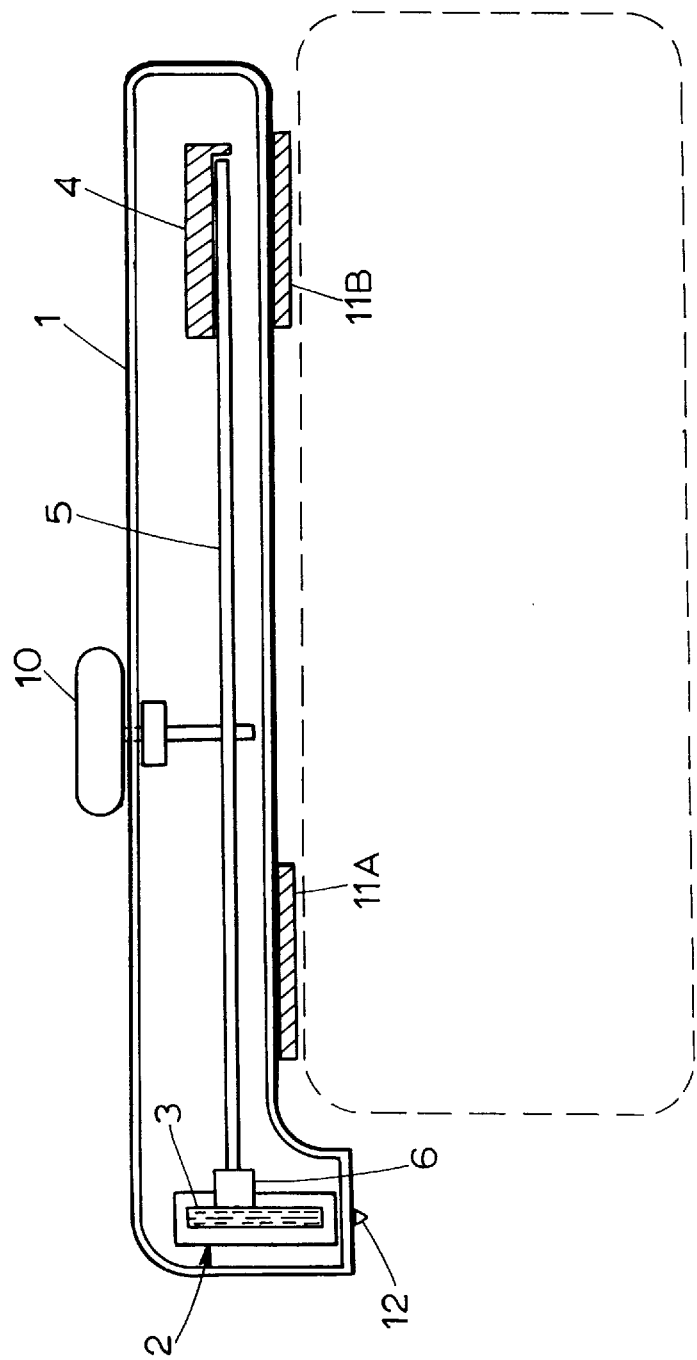

FIG. 4 reveals a top view of the mechanism and how the marker joins a measuring tape.

Figure 5:
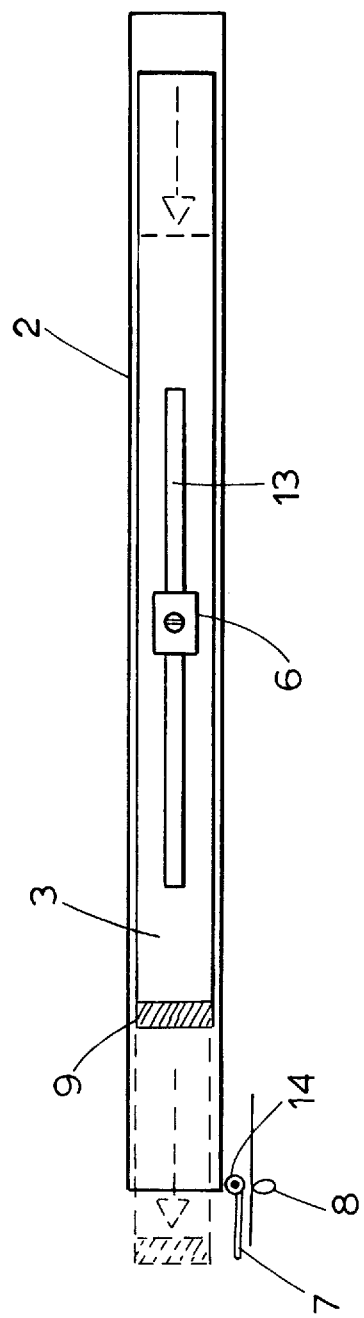

FIG. 5 is a side view of the striker, how it maneuvers inside the slide, and how it opens and closes the slider cap.

REFERENCE NUMERALS IN DRAWINGS

1—Housing
2—Striker Slide
3—Striker (with nylon fiber core)
4—Main Spring Clamp
5—Main Spring
6—Main Spring Seat
7—Slide Cap
8—Cap Spring
9—Ink Head (nylon fiber)
10—Finger pull
11a—Front Mount
11b—Rear Mount
12—Indicator
13—Pull Cavity
14—Cap Pivot
15—High Stop

SUMMARY

In accordance with the present invention a tape measure a marking devise comprises an attachment totally enclosed having a lift, an ink supply (nylon fiber core) with contact head, mounting system if used as attachment, evaporation protection system, and a neutral return.

DESCRIPTION

Figure 1:
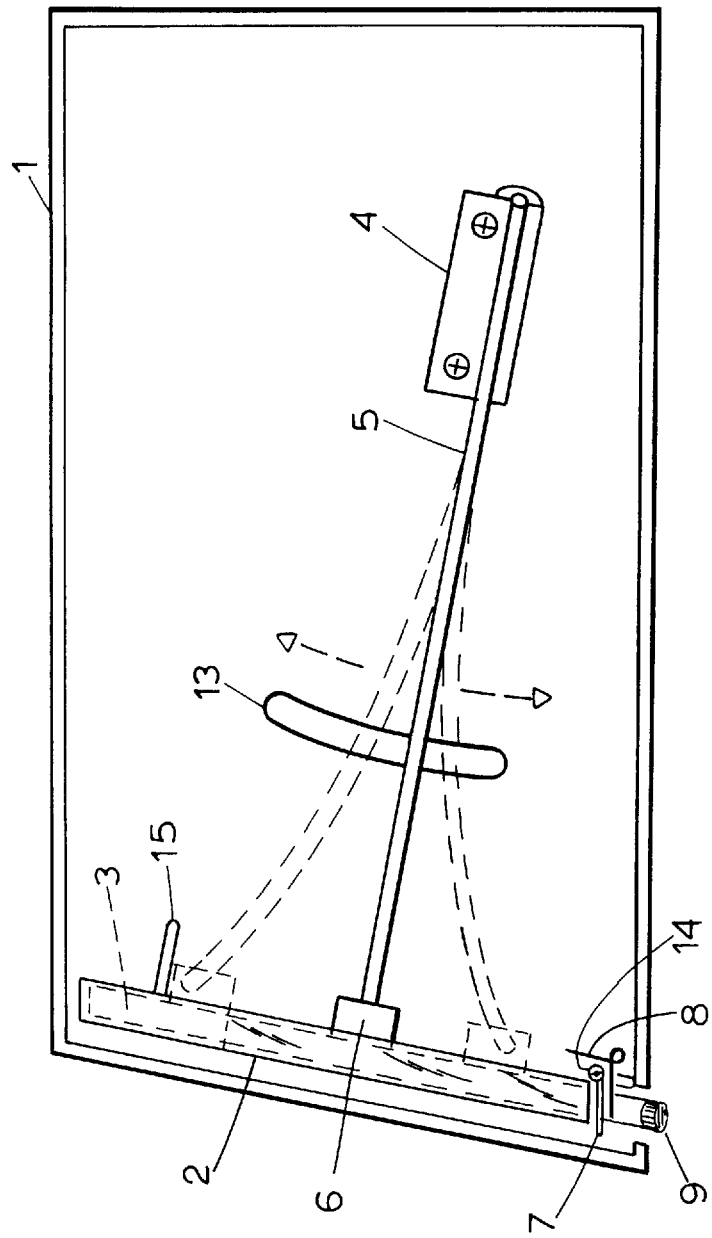
FIG. 1 shows an internal side view of said marker.
Figure 2:
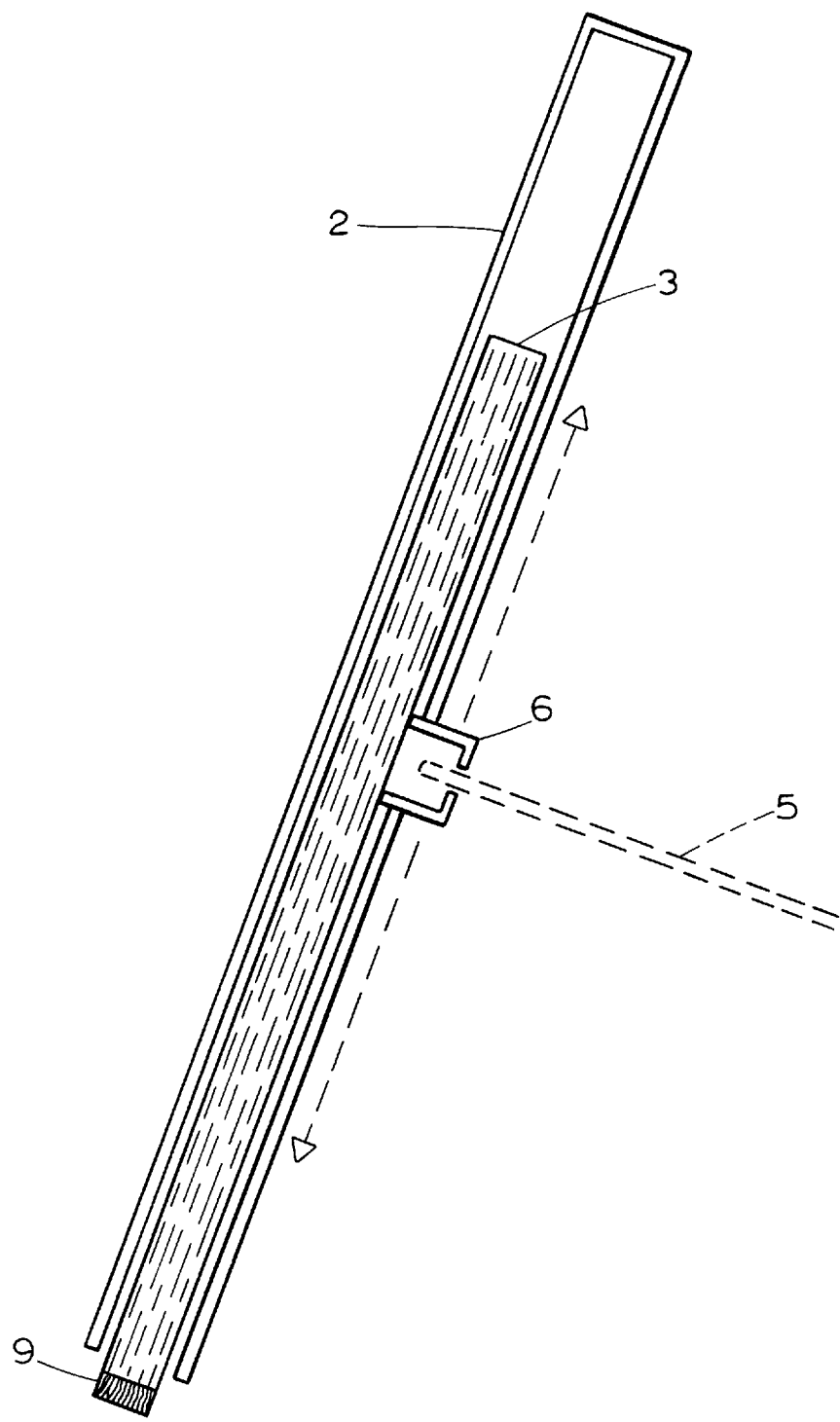
FIG. 2 shows a blowup view of the striker and striker housing.

FIG. 1 shows an internal side view of the "Measure Marker". A housing #1 (FIG. 1) embodies all of the moving parts of the marker less finger pull #10 (FIG. 4). This is one of the unique features of this invention. The front of the housing holds a striker slide #2 (FIG. 1) firmly in position. A striker #3 (FIG. 1) moves up and down within the striker slide freely. It is set in a neutral position by a main spring #5 (FIG. 1). The main spring is held to the striker by a main spring seat #6 (FIG. 1). The seat holds the end of the spring while allowing the striker to slide up and down inside the striker slide. The remaining end of the main spring is held in position by a main spring clamp #4 (FIG. 1). Said clamp allows said spring to float in a perpendicular direction to the striker slide only. The main spring and consequently the striker are lifted by a finger pull #10 (FIG. 4).It is lifted vertically until it reaches a high stop #15 (FIG. 1). At this point it is released. This then forces the striker to plunge downward, force open the slide cap, and initiate contact of an ink head #9 (FIG. 1) to a desired destination. The ink stored in the ink head, by means of a ink filled nylon core striker, is left on the target in the shape of the head itself. It is instantly replenished by capillary action of the ink head and the nylon fiber core of the striker. The main spring now bent in the down position pulls the striker back up to the neutral or starting position. Once in the neutral position, the slide cap is forced back by means of a cap pivot #14 (FIG. 1) and a cap spring #8 (FIG. 1) to close the opening in said striker slide checking evaporation of any ink in the marker. The assembly is now charged and ready to make a new mark whether in a second or a month later. The striker can be changed to accommodate different colors and types of ink permanent or erasable.

The marker is installed on an existing tape measure by removing the paper protector on a front and rear mount #11a and 11b (FIG. 3) then pressing the marker to the front or outer side of the tape measure. FIG. 4 illustrates a top view of a marker attached to a measuring tape with the double sided foam mounting tape between the two.

FIG. 5 shows a side view of the striker and striker slide in its raised, engaged and neutral position. The main spring seat #6 (FIG. 5) is allowed to slide inside a pull cavity #13 (FIGS. 1 and 5).

One can also see the slide cap in an open position with the cap spring coiled. (FIG. 5)

Operation

The mark is made by lifting a finger pull #10 (FIG. 4) to a high stop #15 (FIG. 1) and then releasing said pull. This causes a striker #3 (FIG. 1) to leave the neutral position raise upward to said stop then slide downward causing:

1) A forcing open of slide cap #7 (FIG. 1).

2) A contacting of an ink head #9 (FIG. 1) with the desired target.

3) Ink stored in the striker #3 (FIG. 1) to leave a mark.

Continuous marks are accomplished by means of capillary action of ink stored in the felt or fiber in striker #3 (FIG. 1) to the ink head.

Figure 3:
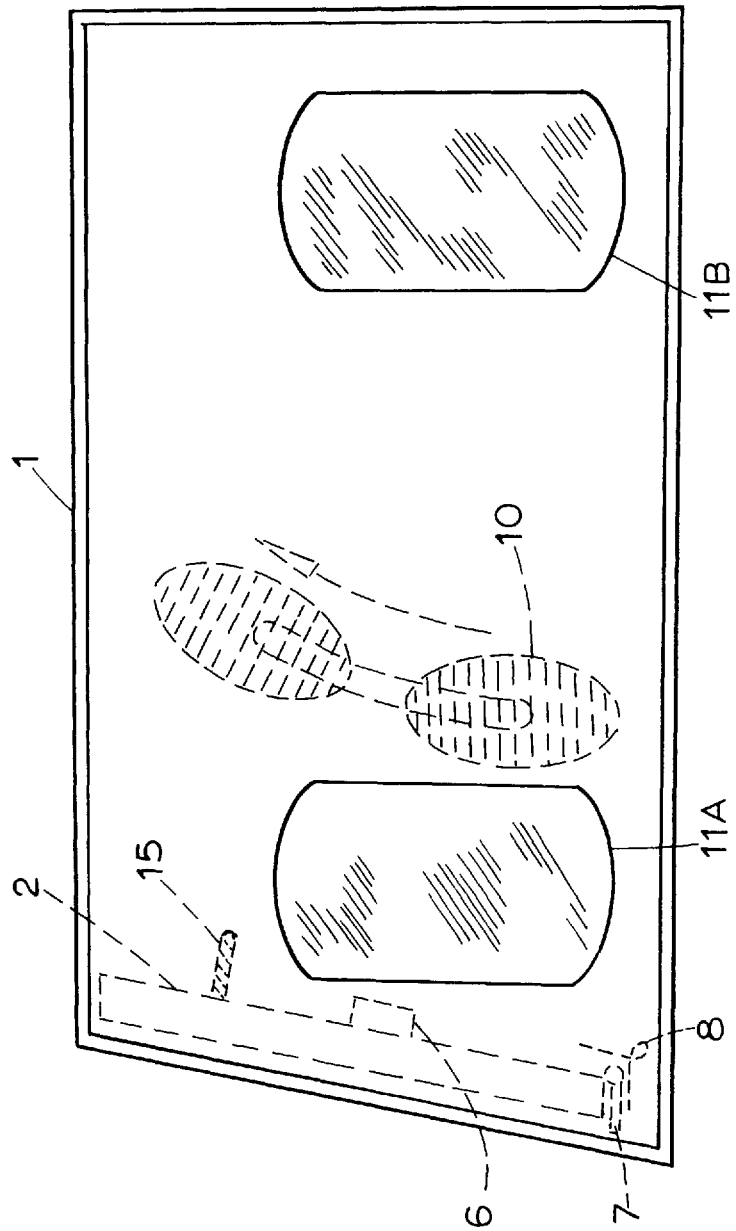
FIG. 3 shows an external view of said marker and mounting apparel.

The marker, if an attachment, can be mounted to any conventional tape measure by means of #11a and #11b (FIG. 3). (foam mounting tape) This is accomplished by simply removing the paper cover from said mount then pressing the "Measure Marker" to the tape measure as illustrated in FIG. 4.

The ink is kept from evaporation by means of a slide cap #7 (FIG. 1) and a slide cap spring #8 (FIG. 1).

The ink head #9 (FIG. 1) is brought back to the neutral position by means of a main spring #5 (FIG. 1). When the main spring #5 (FIG. 1) is in neutral, the slide cap #7 (FIG. 1) is allowed to close the striker slide #2 (FIG. 1) by means of a cap spring #8 (FIG. 1).

Summary, Ramifications, and Scope

Accordingly the reader will see the "Measure Marker" can make marking a measured object quick, safe, easy and consistently clear and accurate. It makes a large perpendicular mark to a sliding tape. If manufactured as an attachment, it mounts to any consumer owned tape measure instantly with no screws or fuss. The unit incorporates a lifting action rather than pushing down motion to make the mark which is less awkward and allows an object to be measured and marked with one hand. The whole unit, less finger pull, is enclosed in a plastic housing for durability, safety, and efficiency. It marks glass and mirror as well and as easy as wood or paper.

I claim:

1. A marking device for a tape measure, comprising:

a housing defining a slide chamber having a first end and a second end in spaced relation thereto;

a marking striker within said slide chamber for sliding movement between said first and second ends thereof;

actuator means associated with said marking striker for moving said marking striker within said slide chamber;

said actuator means being accessible and movable externally of said slide chamber for moving said marking striker within said slide chamber from a neutral position toward at least said second end thereof; and biasing means operative between said actuator means and said marking striker for normally positioning said marking striker at said neutral position generally intermediate said first and second ends of said slide chamber;

said biasing means being such as to cause said marking striker to move from near said second end of said slide chamber through an opening in said first end of said slide chamber to make a mark on an adjacent surface and thereafter return to said neutral position within said slide chamber upon release of said actuator means after said actuator means has been utilized to move said marking striker within said slide chamber from said neutral position toward said second end of said slide chamber.

2. The marking device of claim 1 wherein said biasing means comprises a spring having one end secured to said marking striker by a spring seat and having another end secured to said housing by a spring clamp at a location remote from said spring seat.

3. The marking device of claim 1 wherein said actuator means comprises a finger pull accessible and manually movable externally of said housing and operatively associated with said biasing means to cause said marking striker to make a mark on an adjacent surface.

4. The marking device of claim 1 including a side cap mounted on a cap pivot adjacent said first end of said slide chamber and a cap spring normally biasing said slide cap to a closed position covering said opening in said first end of said slide chamber.

5. The marking device of claim 4 wherein said biasing means comprises a spring having a sufficient force to cause said marking striker to move said slide cap from said closed position to an open position uncovering said opening in said first end of said slide chamber.

6. The marking device of claim 1 wherein said slide chamber comprises an ink filled nylon core striker having an ink head at one end thereof and said nylon core striker is removable from said slide chamber for replacement with another nylon core striker.

7. The marking device of claim 6 wherein said ink head extends generally perpendicular to the direction of extension of a tape from said tape measure so as to make a mark generally perpendicular to the direction of extension of a tape from said tape measure.

8. The marking device of claim 1 including means associated with said housing for mounting said housing to said tape measure including an adhesive double sided tape having a removable protective covering on an outwardly facing surface thereof.

9. The marking device of claim 1 wherein said housing for said marking device comprises at least a portion of a housing for said tape measure such that said marking striker and biasing means are disposed within a housing of said tape measure.

10. A marking device for a tape measure, comprising:

a housing defining a slide chamber having a first, open end and a second, closed end disposed in spaced relation thereto;

a marking striker disposed within said slide chamber for sliding movement between said first end and said second end thereof;

actuator means associated with said marking striker for imparting sliding movement to said marking striker within said slide chamber;

said actuator means being manually accessible and movable externally of said slide chamber for manually moving said marking striker within said slide chamber toward either of said first and second ends thereof; and biasing means operative between said actuator means and said marking striker for normally positioning said marking striker at a neutral position within said slide chamber intermediate said first and second ends thereof;

said actuator means being manually movable toward said first, open end against resistance of said biasing means to directly cause said marking striker to pass through said first, open end to make a mark on an adjacent surface;

said actuator means also being manually movable toward said second, closed end against resistance of said biasing means and released to indirectly cause said marking striker to pass through said first, open end to make a mark on an adjacent surface;

said biasing means being such as to cause said marking striker to move from said second end through said first, open end of said slide chamber upon release of said actuator means when said marking striker is near said second end, said biasing means also being such as to cause said marking striker to return to said neutral position within said slide chamber upon release of said actuator means when said marking striker is near either of said first and second ends, said biasing means thereby being such as to cause said marking striker to return to said neutral position after either directly or indirectly causing said marking striker to make a mark on an adjacent surface.

11. The marking device of claim 10 wherein said biasing means comprises a spring having one end secured to said marking striker by a spring seat and having another end secured to said housing by a spring clamp at a location remote from said spring seat.

12. The marking device of claim 10 wherein said actuator means comprises a finger pull accessible and movable externally of said housing and operatively associated with said biasing means to cause said marking striker to make a mark on an adjacent surface.

13. The marking device of claim 10 including a slide cap mounted on a cap pivot adjacent said first end of said slide chamber and a cap spring normally biasing said slide cap to a closed position covering an opening in said first end of said slide chamber.

14. The marking device of claim 13 wherein said biasing means comprises a spring having a sufficient force to cause said marking striker to move said slide cap from said closed position to an open position uncovering said opening in said first end of said slide chamber.

15. The marking device of claim 10 wherein said slide chamber comprises an ink filled nylon core striker having an ink head at one end thereof and said nylon core striker is removable from said slide chamber for replacement with another nylon core striker.

16. The marking device of claim 15 wherein said ink head extends generally perpendicular to the direction of extension of a tape from said tape measure so as to make a mark generally perpendicular to the direction of extension of a tape from said tape measure.

17. The marking device of claim 10 including means associated with said housing for mounting said housing to said tape measure including an adhesive double sided tape having a removable protective covering on an outwardly facing surface thereof.

18. The marking device of claim 10 wherein said housing for said marking device comprises at least a portion of a housing for said tape measure such that said marking striker and biasing means are disposed within a housing of said tape measure.

* * * * *